United States Patent
Nakagawa et al.

(10) Patent No.: US 12,371,528 B2
(45) Date of Patent: Jul. 29, 2025

(54) POLYESTER RESIN AND METHOD FOR PRODUCING POLYESTER RESIN

(71) Applicant: TOYOBO CO., LTD., Osaka (JP)

(72) Inventors: Satoru Nakagawa, Tsuruga (JP); Kosuke Uotani, Tsuruga (JP); Shinya Kanetaka, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 456 days.

(21) Appl. No.: 17/784,762

(22) PCT Filed: Dec. 14, 2020

(86) PCT No.: PCT/JP2020/046566
§ 371 (c)(1),
(2) Date: Jun. 13, 2022

(87) PCT Pub. No.: WO2021/125137
PCT Pub. Date: Jun. 24, 2021

(65) Prior Publication Data
US 2023/0002551 A1 Jan. 5, 2023

(30) Foreign Application Priority Data
Dec. 18, 2019 (JP) .................. 2019-228360

(51) Int. Cl.
*C08G 63/183* (2006.01)
(52) U.S. Cl.
CPC .................. *C08G 63/183* (2013.01)
(58) Field of Classification Search
CPC ....... C08G 63/183; C08G 63/84; C08G 63/87
USPC ........................................................ 528/282
See application file for complete search history.

(56) References Cited

U.S. PATENT DOCUMENTS

| | | | |
|---|---|---|---|
| 2003/0083191 A1* | 5/2003 | Nakajima | C08G 63/83 502/100 |
| 2008/0249280 A1 | 10/2008 | Kageyama et al. | |
| 2009/0082529 A1 | 3/2009 | Kageyama et al. | |
| 2013/0267674 A1 | 10/2013 | Kita et al. | |

FOREIGN PATENT DOCUMENTS

| | | |
|---|---|---|
| CN | 101029126 | 9/2007 |
| EP | 2641938 | 8/2021 |
| JP | WO2002057335 A1 * | 7/2000 |
| JP | 2005-187560 | 7/2005 |
| JP | 2006-169432 | 6/2006 |
| JP | 2011026405 * | 2/2011 |
| JP | 2011-42778 | 3/2011 |
| WO | 02/057335 | 7/2002 |
| WO | 2006/137145 | 12/2006 |
| WO | 2007/032325 | 3/2007 |

OTHER PUBLICATIONS

Written Opinion of the International Searching Authority for Parent Application PCT/JP2020/046566 mailed to Applicant on Feb. 22, 2021 (Year: 2021).*
Office Action issued May 9, 2023 in corresponding Chinese Patent Application No. 202080083819.2, with English translation.
International Search Report issued Feb. 22, 2021 in International (PCT) Application No. PCT/JP2020/046566.
Extended European Search Report issued Nov. 27, 2023 in corresponding European Patent Application No. 20903927.0.
Office Action issued Dec. 11, 2023 in corresponding Indonesian Patent Application No. P00202206069, with English translation.
Office Action issued Jan. 4, 2024 in corresponding Indian Patent Application No. 202247036725.
Office Action issued Dec. 26, 2024 in Korean Patent Application No. 10-2022-7017704, with English-language translation.

* cited by examiner

*Primary Examiner* — Ling Siu Choi
*Assistant Examiner* — Ronald Grinsted
(74) *Attorney, Agent, or Firm* — Wenderoth, Lind & Ponack, L.L.P.

(57) ABSTRACT

A polyester resin, such as polyethylene terephthalate and a copolymer thereof, that is produced by using a polymerization catalyst containing an aluminum compound, such as an aluminum acetate, and a phosphorus compound, such as a 3,5-di-tert-butyl-4-hydroxybenzylphosphonic acid dialkyl ester, that can reduce a catalyst cost, for which polymerization activity is high, and in which there is less catalyst-derived foreign matter. The polyester resin contains an aluminum compound and a phosphorus compound used as a catalyst, and the amount of aluminum atom contained in the polyester resin is 9 to 20 ppm, the amount of phosphorus atom contained in the polyester resin is 13 to 31 ppm, a mole ratio of the phosphorus atom to the aluminum atom in the polyester resin is 1.32 to 1.80.

4 Claims, 2 Drawing Sheets

[Fig.1]
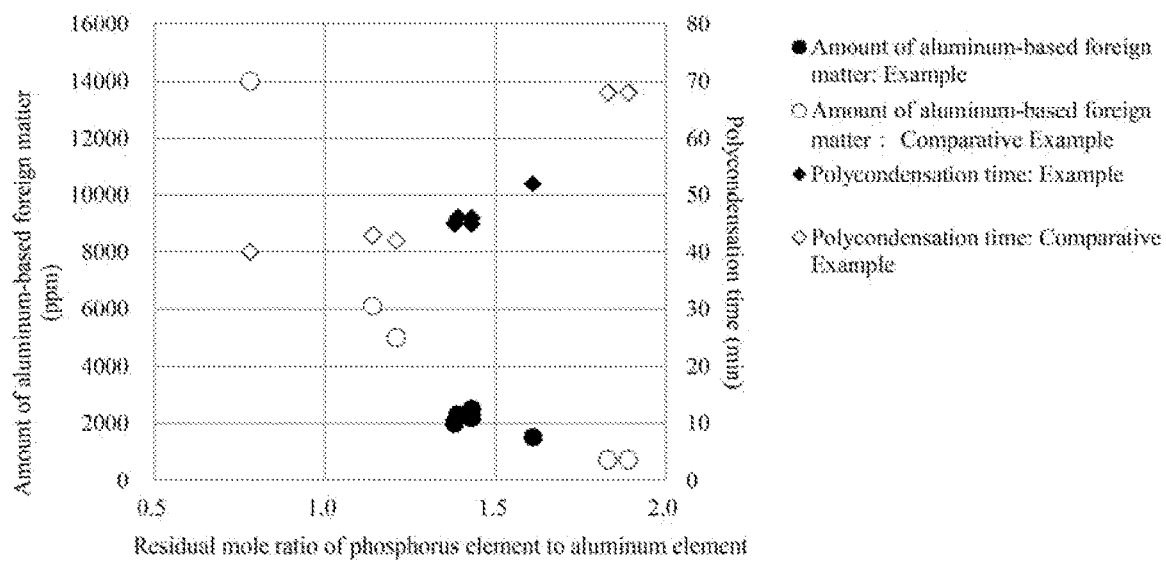
[Fig.2]
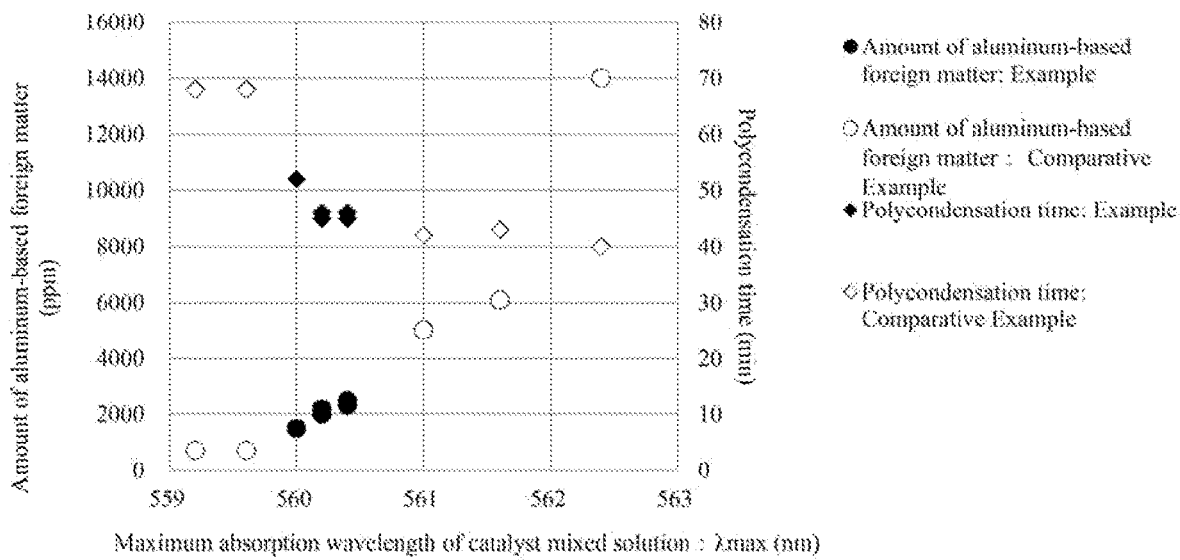

[Fig.3]
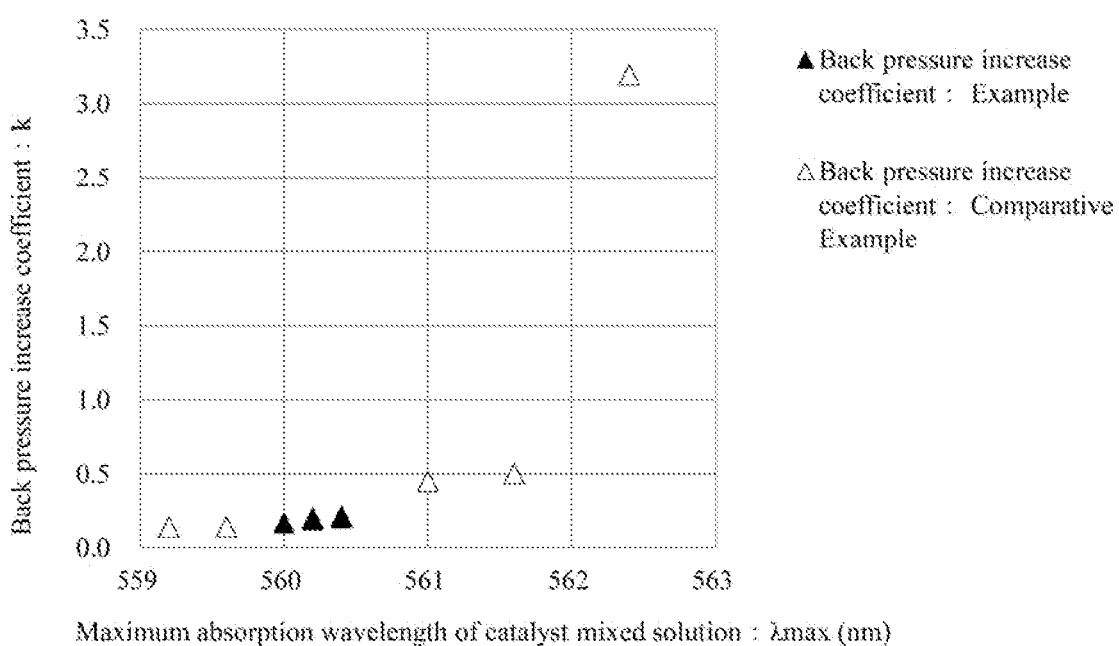

POLYESTER RESIN AND METHOD FOR PRODUCING POLYESTER RESIN

TECHNICAL FIELD

The present invention relates to a polyester resin and a producing method therefor, and more specifically relates to a polyester resin and a producing method therefor in which an aluminum compound and a phosphorus compound are used as a catalyst main component to achieve both suppression of catalyst-derived foreign matter and polymerization activity and further to reduce a catalyst cost.

BACKGROUND ART

Polyesters typified by polyethylene terephthalate (PET), polybutylene terephthalate (PBT), polyethylene naphthalate (PEN), etc., have excellent mechanical properties and chemical properties, and are widely used, for example, in various fields such as fibers for clothing and industrial materials, various films and sheets for packaging, industrial use, etc., and molded products such as bottles and engineering plastics, depending on the properties of each polyester.

As for a polyester containing an aromatic dicarboxylic acid and alkylene glycol as a main component, which is a typical polyester, for example, polyethylene terephthalate (PET) is industrially produced by a polycondensation method in which bis(2-hydroxyethyl) terephthalate is produced by esterification or transesterification of terephthalic acid or dimethyl terephthalate with ethylene glycol and bis(2-hydroxyethyl) terephthalate is polycondensed by using a catalyst at a high temperature and under vacuum, or the like.

Conventionally, an antimony compound or a germanium compound has been widely used as a polyester polymerization catalyst that is used in the polymerization of such a polyester resin. Antimony trioxide is an inexpensive catalyst having excellent catalytic activity. However, when antimony trioxide is used as a main component, that is, when antimony trioxide is used in an amount sufficient to achieve a practical polymerization rate, metal antimony is deposited during polymerization, so that darkening and foreign matter occur on the polyester resin, which also causes surface defects of a film. Moreover, in the case where antimony trioxide is used as a raw material for a hollow molded product or the like, it is difficult to obtain a hollow molded product having excellent transparency. Due to such circumstances, a polyester resin that does not contain any antimony compound or contains no antimony compound as a catalyst main component is desired.

A germanium compound has already been put into practical use as a catalyst that is a catalyst other than an antimony compound, that has excellent catalytic activity, and that provides a polyester resin that does not have the above-described problems. However, this catalyst has a problem that the catalyst is very expensive, and a problem that since the catalyst is easily distilled out of the reaction system during polymerization, the catalyst concentration of the reaction system changes and it becomes difficult to control the polymerization, so that there is a problem when the catalyst is used as a catalyst main component.

Polymerization catalysts that replace antimony-based or germanium-based catalysts have also been studied. Titanium compounds typified by tetraalkoxy titanates have already been proposed, but polyester resins produced using these compounds each have problems that the polyester resin is likely to be thermally deteriorated during melt molding and that the polyester resin is significantly colored.

Due to the above-described circumstances, a polymerization catalyst that contains a metal component other than an antimony-based, germanium-based, and titanium-based components as a main metal component and that has excellent catalytic activity and provides a polyester resin having excellent color tone and thermal stability and providing a molded product having excellent transparency, is desired.

As a novel polymerization catalyst, a catalyst system composed of an aluminum compound and a phosphorus compound has been disclosed and is attracting attention (see, for example, Patent Documents 1 and 2).

By using the above polymerization catalyst, a polyester resin having good color tone, transparency, and thermal stability can be obtained. However, this method has a problem that the addition amount of the catalyst is large and the cost of the phosphorus compound used is also high, thereby increasing the cost of the catalyst required for polymerization.

Moreover, in order to obtain a high-quality polyester resin while maintaining high polymerization activity, it is necessary to increase the amounts of the aluminum compound and the addition phosphorus compound as a catalyst, and as a result, there is a problem that the catalyst cost is increased.

PRIOR ART DOCUMENTS

Patent Documents

Patent Document 1: International Publication No. WO2007/032325
Patent Document 2: Japanese Laid-Open Patent Publication No. 2006-169432

SUMMARY OF THE INVENTION

Problems to be Solved by the Invention

The present invention has been made to solve such problems of the conventional art, and an object of the present invention is to provide a high-quality polyester resin that is produced by using a polymerization catalyst containing an aluminum compound and a phosphorus compound, that can reduce a catalyst cost, for which polymerization activity is high, and in which there is less foreign matter, and a method for producing the polyester resin.

Solution to the Problems

As a result of earnest studies being conducted in order to solve the above problems, the present inventors have found that the object can be achieved by reducing the amount of aluminum atom contained in a polyester resin and setting the mole ratio of phosphorus atom to aluminum atom to be in an appropriate range, and have arrived at the present invention.

With regard to a polymerization catalyst such as an antimony compound and a germanium compound used in polyester polymerization, the polymerization activity is generally proportional to the amount of the catalyst. However, with regard to a polymerization catalyst containing an aluminum compound and a phosphorus compound, a complex formation reaction of the aluminum compound and the phosphorus compound affects the polymerization activity, so that the relationship between the polymerization activity and the addition amount of the catalyst cannot be simplified.

Therefore, the present inventors have analyzed the dominant factors of catalytic activity for a polymerization catalyst containing an aluminum compound and a phosphorus compound. As a result, the present inventors have found that, by reducing the amount of aluminum atom in a polyester resin, setting the mole ratio of phosphorus atom to aluminum atom to be in an appropriate range, and further setting the acidity or basicity of an aluminum compound solution, a phosphorus compound solution, or a mixed solution thereof, which are added as a catalyst, to be in a preferable range, the catalyst cost can be reduced, an increase in the amount of aluminum-based foreign matter can be suppressed, and the polymerization activity can be improved. As a result, the present inventors have completed the present invention.

That is, the present invention has the following configuration.

[1] A polyester resin containing an aluminum compound and a phosphorus compound used as a catalyst, wherein the following formulas (1) to (3) are satisfied, $$9 \leq Al \leq 20 \tag{1}$$

$$13 \leq P \leq 31, \text{ and} \tag{2}$$

$$1.32 \leq P/Al \leq 1.80, \tag{3}$$

wherein, in the formulas (1) to (3), Al denotes an amount based on mass (ppm) of aluminum atom contained in the polyester resin, P denotes an amount based on mass (ppm) of phosphorus atom contained in the polyester resin, and P/Al denotes a mole ratio of phosphorus atom to aluminum atom in the polyester resin.

[2] The polyester resin according to the above [1], wherein a content of aluminum-based foreign matter with respect to a mass of the polyester resin is not larger than 3000 ppm.

[3] The polyester resin according to the above [1] or [2], wherein the polyester resin has an intrinsic viscosity (IV) of not less than 0.56 dl/g.

[4] The polyester resin according to any one of the above [1] to [3], wherein the phosphorus compound is a 3,5-di-tert-butyl-4-hydroxybenzylphosphonic acid dialkyl ester.

[5] A method for producing a polyester resin by a batch type polymerization method, wherein an aluminum compound and a phosphorus compound are used as a catalyst, the phosphorus compound is a 3,5-di-tert-butyl-4-hydroxybenzylphosphonic acid dialkyl ester, and after an esterification reaction is completed, an ethylene glycol solution of the aluminum compound and an ethylene glycol solution of the phosphorus compound are added in amounts that satisfy the following formulas (4) to (6), $$9 \leq Al \leq 20, \tag{4}$$

$$20 \leq P \leq 40, \text{ and} \tag{5}$$

$$1.50 \leq P/Al \leq 2.50, \tag{6}$$

wherein, in the formulas (4) to (6), Al denotes an amount based on mass (ppm) of aluminum atom with respect to a polyester to be produced, P denotes an amount based on mass (ppm) of phosphorus atom with respect to the polyester to be produced, and P/Al denotes a mole ratio of an addition amount of phosphorus atom in formula (5) to an addition amount of aluminum atom in formula (4).

[6] A method for producing a polyester resin by a continuous polymerization method, wherein an aluminum compound and a phosphorus compound are used as a catalyst, the phosphorus compound is a 3,5-di-tert-butyl-4-hydroxybenzylphosphonic acid dialkyl ester, and an ethylene glycol solution of the aluminum compound and an ethylene glycol solution of the phosphorus compound are added in amounts that satisfy the following formulas (4) to (6), to an outlet of a final esterification reaction tank or a transfer line between the final esterification reaction tank and an initial polymerization reaction tank, $$9 \leq Al \leq 20, \tag{4}$$

$$20 \leq P \leq 40, \text{ and} \tag{5}$$

$$1.50 \leq P/Al \leq 2.50, \tag{6}$$

wherein, in the formulas (4) to (6). Al denotes an amount based on mass (ppm) of aluminum atom with respect to a polyester to be produced. P denotes an amount based on mass (ppm) of phosphorus atom with respect to the polyester to be produced, and P/Al denotes a mole ratio of an addition amount of phosphorus atom in formula (5) to an addition amount of aluminum atom in formula (4).

[7] The method for producing the polyester resin according to the above [5] or [6], wherein a solution having a maximum absorption wavelength of 458.0 to 465.0 nm measured by a color reaction P is used as the ethylene glycol solution of the phosphorus compound, and the maximum absorption wavelength measured by the color reaction P is obtained by adding 4 mL of ethylene glycol and 0.3 mL of a 1 mmol/L aqueous solution of Bismarck Brown, which is a basic dye, to a sample bottle, then adding 0.1 nil, of the ethylene glycol solution of the phosphorus compound thereto, shaking the solution for 10 seconds until the solution becomes uniform, allowing the solution to stand at room temperature for 10 minutes, and then measuring an absorption spectrum using an ultraviolet visible spectrophotometer.

[8] The method for producing the polyester resin according to any one of the above [5] to [7], wherein heat treatment is performed at 175 to 196° C. for 30 to 240 minutes when preparing the ethylene glycol solution of the phosphorus compound.

[9] The method for producing the polyester resin according to any one of the above [5] to [8], wherein a solution having a maximum absorption wavelength of 562.0 to 572.0 nm measured by a color reaction A is used as the ethylene glycol solution of the aluminum compound, and the maximum absorption wavelength measured by the color reaction A is obtained by adding 4 mL of ethylene glycol and 0.3 mL of a 1 mmol/L aqueous solution of Mordant Blue 13, which is an acid dye, to a sample bottle, then adding 0.1 mL of the ethylene glycol solution of the aluminum compound thereto, shaking the solution for 10 seconds until the solution becomes uniform, allowing the solution to stand at room temperature for 10 minutes, and then measuring an absorption spectrum using an ultraviolet visible spectrophotometer.

[10] The method for producing the polyester resin according to any one of the above [5] to [9], wherein a solution which is a mixed solution obtained by mixing the ethylene glycol solution of the aluminum compound and the ethylene glycol solution of the phosphorus compound at a ratio of amounts to be added in a production process for the polyester resin and which has a maximum absorption wavelength of 559.5 to 561.5 nm measured by a color reaction AP, is used as the ethylene glycol solution of the aluminum compound and the ethylene glycol solution of the phosphorus compound, and the maximum absorption wavelength measured by the color reaction AP is obtained by adding 4 mL of ethylene glycol and 0.3 mL of a 1 mmol/L aqueous solution of Mordant Blue 13, which is an acid dye, to a sample bottle, then adding 0.1 mL of the mixed solution of the ethylene glycol solution of the aluminum compound and the ethylene glycol solution of the phosphorus compound thereto, shaking the solution for 10 seconds until the solution becomes uniform, allowing the solution to stand at room temperature for 10 minutes, and then measuring an absorption spectrum using an ultraviolet visible spectrophotometer.

Effect of the Invention

The polyester resin of the present invention can improve the productivity of the polyester resin while reducing the catalyst cost to be low, which is a problem of a polymerization catalyst containing an aluminum compound and a phosphorus compound, and can reduce the catalyst-derived foreign matter contained in the polyester resin.

BRIEF DESCRIPTION OF THE DRAWINGS

FIG. 1 is a diagram of the correlation between a residual mole ratio of phosphorus atom to aluminum atom, an amount of aluminum-based foreign matter, and a polycondensation time obtained from the results of Examples and Comparative Examples.

FIG. 2 is a diagram of the correlation between a maximum absorption wavelength of a catalyst mixed solution of an ethylene glycol solution of an aluminum compound and an ethylene glycol solution of a phosphorus compound, an amount of aluminum-based foreign matter, and a polycondensation time obtained from the results of Examples and Comparative Examples.

FIG. 3 is a diagram of the correlation between the maximum absorption wavelength of the catalyst mixed solution of the ethylene glycol solution of the aluminum compound and the ethylene glycol solution of the phosphorus compound and a back pressure increase coefficient obtained from the results of Examples and Comparative Examples.

MODE FOR CARRYING OUT THE INVENTION

The present invention will be described in detail below.

In the present invention, the polyester resin refers to a polyester in which a polyester as a chemical substance contains a catalyst component (including a component described later obtained by changing the structure of a catalyst, a catalyst-derived foreign matter component, etc.). In the present description, the "polyester" and the "polyester resin" are described so as to be distinguished from each other as much as possible, but, for convenience, are sometimes described without being distinguished from each other.

The polyester in the present invention refers to polyesters each formed from one or more substances selected from polyvalent carboxylic acids including dicarboxylic acids and ester-forming derivatives thereof and one or more substances selected from polyhydric alcohols including glycols, polyesters formed from hydroxycarboxylic acids and ester-forming derivatives thereof, or polyesters formed from cyclic esters.

A preferable polyester is a polyester in which a main polyvalent carboxylic acid component is terephthalic acid or an ester-forming derivative thereof or is a naphthalene dicarboxylic acid or an ester-forming derivative thereof, and a main polyhydric alcohol component is an alkylene glycol.

A polyester in which a main polyvalent carboxylic acid component is terephthalic acid or an ester-forming derivative thereof or is a naphthalene dicarboxylic acid or an ester-forming derivative thereof is preferably a polyester in which the total amount of terephthalic acid or the ester-forming derivative thereof and the naphthalene dicarboxylic acid or the ester-forming derivative thereof contained with respect to the entire polyvalent carboxylic acid component is not less than 70 mol %, more preferably a polyester in which such a total amount is not less than 80 mol %, and further preferably a polyester in which such a total amount is not less than 90 mol %.

A polyester in which a main polyhydric alcohol component is an alkylene glycol is preferably a polyester in which the total amount of the alkylene glycol contained with respect to the entire polyhydric alcohol component is not less than 70 mol %, more preferably a polyester in which such a total amount is not less than 80 mol %, and further preferably a polyester in which such a total amount is not less than 90 mol %.

Examples of dicarboxylic acids include: saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid, and dimer acid, or ester-forming derivatives thereof; unsaturated aliphatic dicarboxylic acids such as fumaric acid, maleic acid, and itaconic acid, or ester-forming derivatives thereof; and aromatic dicarboxylic acids such as orthophthalic acid, isophthalic acid, terephthalic acid, 5-(alkali metal)sulfoisophthalic acids, diphenic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyldicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, pamoic acid, and anthracene dicarboxylic acid, or ester-forming derivatives thereof.

Among these dicarboxylic acids, terephthalic acid, naphthalene dicarboxylic acids, or ester-forming derivatives thereof are preferable.

Examples of naphthalene dicarboxylic acids or ester-forming derivatives thereof include 1,3-naphthalene dicarboxylic acid, 1,4-naphthalene dicarboxylic acid, 1,5-naphthalene dicarboxylic acid, 2,6-naphthalene dicarboxylic acid, and 2,7-naphthalene dicarboxylic acid, or ester-forming derivatives thereof.

Terephthalic acid, 2,6-naphthalene dicarboxylic acid, or ester-forming derivatives thereof are particularly preferable. If necessary, other dicarboxylic acids may be used as components.

Examples of polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3',4'-biphenyltetracarboxylic acid, and ester-forming derivatives thereof.

Examples of glycols include: alkylene glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentylglycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, and 1,12-dodecanediol; aliphatic glycols such as polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(p-hydroxyethoxyphenyl) sulfone, bis(p-hydroxyphenyl)ether, bis(p-hydroxyphenyl) sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to these glycols.

Among these glycols, alkylene glycols are preferable, and ethylene glycol, 1,3-propylene glycol, 1,4-butylene glycol, and 1,4-cyclohexanedimethanol are further preferable. In addition, the alkylene glycols may contain a substituent or an alicyclic structure in the molecular chain thereof, and two or more of the alkylene glycols may be used at the same time.

Examples of polyhydric alcohols other than these glycols include trimethylolmethane, trimethylolethane, trimethylolpropane, pentaerythritol, glycerol, and hexanetriol.

Examples of hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexane carboxylic acid, or ester-forming derivatives thereof.

Examples of cyclic esters include ε-caprolactone, β-propiolactone, β-methyl-p-propiolactone, δ-valerolactone, glycolide, and lactide.

Examples of ester-forming derivatives of polyvalent carboxylic acids or hydroxycarboxylic acids include alkyl esters, acid chlorides, and acid anhydrides thereof.

As the polyester used in the present invention, polyethylene terephthalate, polybutylene terephthalate, polypropylene terephthalate, poly(1,4-cyclohexane dimethylene terephthalate), polyethylene naphthalate, polybutylene naphthalate, polypropylene naphthalate, and copolymers thereof are preferable, and polyethylene terephthalate and a copolymer thereof are particularly preferable.

The polyester resin of the present invention needs to use an aluminum compound and a phosphorus compound as a catalyst and contain these compounds in amounts thereof that satisfy the following formulas (1) to (3):

$$9 \leq Al \leq 20, \quad (1)$$

$$13 \leq P \leq 31, \text{ and} \quad (2)$$

$$1.32 \leq P/Al \leq 1.80, \quad (3)$$

wherein, in the formulas (1) to (3), Al denotes the amount based on mass (ppm) of aluminum atom contained in the polyester resin, P denotes the amount based on mass (ppm) of phosphorus atom contained in the polyester resin, and P/Al denotes the mole ratio of phosphorus atom to aluminum atom in the polyester resin.

In the present invention, "ppm" represents a value based on mass unless otherwise specified.

In the present invention, the content of aluminum atom in the polyester resin needs to be 9 to 20 ppm, and is preferably 9 to 19 ppm, more preferably 10 to 17 ppm, and further preferably 12 to 17 ppm. If the content of aluminum atom is less than the above range, sufficient catalytic activity is not exhibited in some cases. On the other hand, if the content of aluminum atom exceeds the above range, the amount of aluminum-based foreign matter described later may increase, and the cost of the catalyst also increases, so that such a content is not preferable.

Moreover, in the present invention, the content of phosphorus atom in the polyester resin needs to be 13 to 31 ppm, and is preferably 15 to 29 ppm and more preferably 16 to 28 ppm. If the content of phosphorus atom is less than the above range, sufficient catalytic activity is not exhibited in some cases, or the amount of aluminum-based foreign matter described later may increase. On the other hand, if the content of phosphorus atom exceeds the above range, the polymerization activity may be lowered, and the cost of the catalyst also increases, so that such a content is not preferable.

Furthermore, in the present invention, the mole ratio of phosphorus atom to aluminum atom contained in the polyester resin, that is, remaining in the polyester resin (hereinafter, also referred to as "residual mole ratio of phosphorus atom to aluminum atom" in order to distinguish from the "addition mole ratio of phosphorus atom to aluminum atom" described later), is also important. Specifically, the residual mole ratio (P/Al ratio) of phosphorus atom to aluminum atom in the polyester resin needs to be 1.32 to 1.80 and is preferably 1.38 to 1.68.

As described above, the aluminum atom and the phosphorus atom in the polyester resin are derived from the aluminum compound and the phosphorus compound, which are used as a polymerization catalyst for the polyester resin, respectively. When the aluminum compound and the phosphorus compound are used in combination at a specific ratio, a complex having catalytic activity can be functionally formed in the polymerization system, so that sufficient polymerization activity can be exhibited.

If the residual mole ratio of phosphorus atom to aluminum atom in the polyester resin is less than the above range, a decrease in thermal stability and thermal oxidation stability may become a problem, or the amount of aluminum-based foreign matter described later may increase. On the other hand, if the residual mole ratio of phosphorus atom to aluminum atom in the polyester resin exceeds the above range, the cost of the catalyst increases, so that such a residual mole ratio is not preferable.

As the aluminum compound in the present invention, a known aluminum compound can be used without limitation.

Specific examples of the aluminum compound include: carboxylates such as aluminum formate, aluminum acetate, basic aluminum acetate, aluminum propionate, and aluminum oxalate; inorganic acid salts such as aluminum chloride, aluminum hydroxide, and aluminum hydroxychloride; aluminum alkoxide such as aluminum methoxide, aluminum ethoxide, aluminum isopropoxide, aluminum n-butoxide, and aluminum t-butoxide; aluminum chelate compounds such as aluminum acetylacetonate and aluminum acetylacetate; and organic aluminum compounds such as trimethylaluminum and triethylaluminum, and partially hydrolyzed products and aluminum oxides thereof. Among these compounds, carboxylates, inorganic acid salts, and chelate compounds are preferable. Among them, aluminum acetate, basic aluminum acetate, aluminum chloride, aluminum hydroxide, aluminum hydroxychloride, and aluminum acetylacetonate are more preferable, and aluminum acetate and basic aluminum acetate are most preferable.

As the phosphorus compound in the present invention, a 3,5-di-tert-butyl-4-hydroxybenzylphosphonic acid dialkyl ester is preferable. This compound is a compound represented by chemical formula (1).

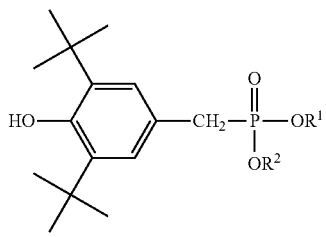

chemical formula (1)

In chemical formula (1), $R^1$ and $R^2$ each represent hydrogen or an alkyl group having 1 to 4 carbon atoms.

The alkyl group in the above chemical formula (1) preferably has 1 to 4 carbon atoms. In particular, an ethyl ester compound having two carbon atoms is preferable, since it is commercially available as Irganox 1222 (manufactured by BASF) and can easily be acquired. This compound is represented by chemical formula (1-a).

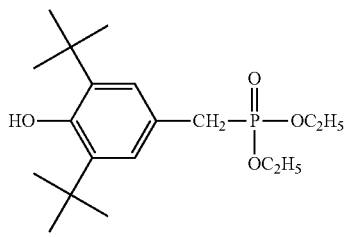

chemical formula (1-a)

In the present invention, in addition to the above-described aluminum compound and phosphorus compound, other polycondensation catalysts such as an antimony compound, a germanium compound, and a titanium compound may be used in combination as long as no problem arises in a product such as the properties, processability, and color tone of the polyester resin of the present invention.

In this case, as for the antimony compound, the content of antimony atom with respect to the obtained polyester resin is preferably not larger than 30 ppm; as for the germanium compound, the content of germanium atom with respect to the obtained polyester resin is preferably not larger than 10 ppm; and as for the titanium compound, the content of titanium atom with respect to the obtained polyester resin is preferably not larger than 3 ppm. However, for the object of the present invention, it is preferable that the other polycondensation catalysts such as the antimony compound, the germanium compound, and the titanium compound are not used as much as possible.

In the polyester resin of the present invention, the content of aluminum-based foreign matter with respect to the mass of the polyester resin is preferably not larger than 3000 ppm, more preferably not larger than 2800 ppm, further preferably not larger than 2500 ppm, and particularly preferably not larger than 2300 ppm. The aluminum-based foreign matter is foreign matter derived from the aluminum compound used as a polymerization catalyst, and is foreign matter that is insoluble in the polyester resin. If the content of aluminum-based foreign matter exceeds the above, the quality of fibers, films, molded products, etc., deteriorates due to fine foreign matter insoluble in the polyester resin, so that such a content is not preferable. In addition, such a content leads to a problem that a filter is often clogged during polyester filtration in a polycondensation process or a molding process. The lower limit of the content of aluminum-based foreign matter is preferably 0 ppm, but a lower limit that can be achieved in the present invention is about 300 ppm.

The method for measuring the amount of aluminum-based foreign matter was carried out according to an evaluation method (4) in EXAMPLES described later. As can be seen from this measurement method, this index is for relatively evaluating the amount of aluminum-based foreign matter, and does not indicate the absolute value of the amount of foreign matter contained in the polyester resin.

The intrinsic viscosity (IV) of the polyester resin of the present invention is preferably not less than 0.56 dl/g, more preferably 0.56 to 1.00 dl/g, and further preferably 0.60 to 0.85 dl/g. If the intrinsic viscosity of the polyester resin is less than the above, the mechanical strength and the impact resistance of a molded product may be insufficient. On the other hand, if the intrinsic viscosity of the polyester resin exceeds the above range, the economic efficiency is decreased, so that such an intrinsic viscosity is not preferable.

A back pressure increase coefficient (k) of the polyester resin of the present invention is preferably not larger than 0.40 and more preferably not larger than 0.30. If the back pressure increase coefficient (k) exceeds the above, the frequency of filter clogging when melt molding the polyester resin into fibers, films, molded products, etc., is increased, and the productivity is decreased due to frequent filter replacement, increasing the cost, so that such a back pressure increase coefficient (k) is not preferable. The lower limit of the back pressure increase coefficient (k) is preferably 0, but is about 0.1 due to technical restrictions.

The method for measuring the back pressure increase coefficient (k) was carried out according to an evaluation method (8) in EXAMPLES described later.

Next, a method for producing the polyester resin of the present invention will be described.

The method for producing the polyester resin is not particularly limited, and by a direct esterification method with a polyvalent carboxylic acid including terephthalic acid or the like and a polyhydric alcohol or by a transesterification method with an alkyl ester such as terephthalic acid or the like and a polyhydric alcohol, an oligomer of terephthalic acid or the like and the polyhydric alcohol is obtained, and then melt polycondensation thereof is performed under normal pressure or reduced pressure, whereby the polyester resin can be obtained. At this time, an esterification catalyst or the above polycondensation catalyst can be used as necessary. The polymerization method may be a batch type polymerization method or a continuous polymerization method. In addition, a device for the polymerization may be a batch type or a continuous type.

The polyester resin according to the present invention can be produced by a method including known steps, except that a polyester polymerization catalyst containing an aluminum compound and a phosphorus compound is used and the following method of adding the polymerization catalyst is to be noted. For example, in the case of producing PET, PET is produced by a direct esterification method in which terephthalic acid, ethylene glycol, and, if necessary, another copolymerization component are directly reacted, water is distilled off, esterification is performed, and then polycondensation is performed under reduced pressure, or by a transesterification method in which dimethyl terephthalate, ethylene glycol, and, if necessary, another copolymerization component are reacted, methyl alcohol is distilled off, and transesterification is performed, and then polycondensation is performed under reduced pressure. Furthermore, if necessary, solid phase polymerization may be performed in order to increase the limiting viscosity.

In each of these methods, the esterification reaction or the transesterification reaction may be carried out in one step or may be carried out in multiple steps. The melt polycondensation reaction also may be carried out in one step or may be carried out in multiple steps. Similar to the melt polycondensation reaction, the solid phase polymerization reaction can be carried out by a continuous device.

In the case where the aluminum compound and the phosphorus compound are used as a catalyst, the compounds are preferably added in the form of a slurry or solution, a solution obtained by solubilizing the compounds in a solvent such as water or glycol is more preferably used, a solution obtained by solubilizing the compounds in water and/or ethylene glycol is further preferably used, and a solution obtained by solubilizing the compounds in ethylene glycol is most preferably used.

In the present invention, it is preferable that after the esterification reaction or the transesterification reaction is completed, an ethylene glycol solution of the aluminum compound and an ethylene glycol solution of the phosphorus compound are added as a catalyst such that the above preferable range of the content (residual amount) in the polyester resin is satisfied. If the solutions are added before the completion of the esterification reaction or the transesterification reaction, the amount of aluminum-based foreign matter may increase.

When the ethylene glycol solution of the aluminum compound and the ethylene glycol solution of the phosphorus compound are added such that the above preferable range of the content (residual amount) in the polyester resin is satisfied, a complex having catalytic activity can be functionally formed in the polymerization system, so that sufficient polymerization activity can be exhibited. In addition, generation of aluminum-based foreign matter can also be suppressed.

The aluminum atom in the aluminum compound which serves as a catalyst remains in almost 100% of the use amount initially added to the system as a catalyst, in the polyester resin produced through polymerization, even when being put in a reduced pressure environment during polymerization of the polyester resin. Therefore, when the aluminum compound is added in the above range, the residual amount of aluminum atom in the polyester resin becomes the required aluminum residual amount.

Moreover, the phosphorus compound which serves as a catalyst together with the aluminum compound is removed, from the system, in a part (about 10 to 40%) of the use amount initially added to the system as a catalyst, when being put in a reduced pressure environment during polymerization of the polyester resin, but this removal ratio changes depending on the addition mole ratio between the aluminum compound and the phosphorus compound, the basicity or acidity of the aluminum compound and the phosphorus compound solution to be added, an addition method for the aluminum compound solution and the phosphorus compound solution (whether the solutions are added in the form of one liquid, whether the solutions are added separately), etc. Therefore, it is preferable to appropriately set the removal ratio such that the above preferable range in the polyester resin is satisfied.

A producing method in the case where a 3,5-di-tert-butyl-4-hydroxybenzylphosphonic acid dialkyl ester is used as the phosphorus compound will be described in detail. In both the batch type polymerization method and the continuous polymerization method, preferably, an aluminum compound and a phosphorus compound are used as a catalyst, and after the esterification reaction is completed, an ethylene glycol solution of the aluminum compound and an ethylene glycol solution of the phosphorus compound are added in amounts that satisfy the following formulas (4) to (6);

$$9 \leq Al \leq 20, \tag{4}$$

$$20 \leq P \leq 40, \text{ and} \tag{5}$$

$$1.50 \leq P/Al \leq 2.50, \tag{6}$$

wherein, in the formulas (4) to (6), Al denotes the amount based on mass (ppm) of aluminum atom with respect to the polyester to be produced, P denotes the amount based on mass (ppm) of phosphorus atom with respect to the polyester to be produced, and P/Al denotes the mole ratio of the addition amount of phosphorus atom in formula (5) to the addition amount of aluminum atom in formula (4).

P/Al in formula (6) is sometimes referred to as an addition mole ratio of phosphorus atom to aluminum atom.

The addition amount of aluminum atom is more preferably 9 to 19 ppm. The addition amount of phosphorus atom is preferably 20 to 38 ppm. The addition mole ratio of phosphorus atom to aluminum atom is more preferably 1.50 to 2.30.

The amount (mass) of the polyester to be produced can be calculated from the amount (mass) of the polyvalent carboxylic acid including terephthalic acid or the like used as a raw material.

Hereinafter, the maximum absorption wavelengths of the ethylene glycol solution of the aluminum compound and the ethylene glycol solution of the phosphorus compound will be described. When the maximum absorption wavelengths of the ethylene glycol solution of the aluminum compound and the ethylene glycol solution of the phosphorus compound are controlled to be in a specific range, the polymerization activity can be stabilized, and a polyester resin having stable quality can be obtained. When the maximum absorption wavelengths of the ethylene glycol solution of the aluminum compound and the ethylene glycol solution of the phosphorus compound are controlled to be in a specific range, the Lewis acid/base characteristics of the ethylene glycol solution of the aluminum compound and the ethylene glycol solution of the phosphorus compound can be controlled to be in a specific range, and it is inferred that the Lewis acid/base characteristics affect a complex formation reaction of the aluminum compound and the phosphorus compound, and the complex formation reaction affects the polymerization activity.

A color reaction A in the present invention will be described.

The ethylene glycol solution of the aluminum compound used in the present invention preferably has a maximum absorption wavelength of 562.0 to 572.0 nm measured after mixing with a 1 mmol/L aqueous solution of Mordant Blue 13, which is an acid dye. The maximum absorption wavelength is more preferably 567.0 to 572.0 nm.

In order for the aluminum compound to functionally form a complex having catalytic activity together with the phosphorus compound to exhibit polymerization activity, it is important to set the basicity of the aluminum compound contained in the ethylene glycol solution to be in a specific range.

The above maximum absorption wavelength is affected by the type and the addition amount of the aluminum compound to be used, or the temperature, the pressure, the time, or the like when preparing the ethylene glycol solution. For example, in a preferable embodiment, an aluminum compound having an aluminum content in a specific range is used, or an aqueous solution is treated under reduced pressure or under vacuum when being made into an ethylene glycol solution in the preparation of the ethylene glycol solution of the aluminum compound.

If the maximum absorption wavelength is less than the above range, the basicity of the aluminum compound in the solution is low, and a complex with the phosphorus compound is not sufficiently formed, so that there is a possibility that the polymerization activity decreases or the amount of aluminum-based foreign matter increases. On the other hand, it is technically difficult for the maximum absorption wavelength to exceed the above range.

The method for measuring the maximum absorption wavelength (color reaction A) of the ethylene glycol solution of the aluminum compound was carried out according to an evaluation method (6) in EXAMPLES described later.

A color reaction P in the present invention will be described.

The ethylene glycol solution of the phosphorus compound used in the present invention preferably has a maximum absorption wavelength of 458.0 to 465.0 nm measured after mixing with a 1 mmol/L aqueous solution of Bismarck Brown, which is an basic dye. The maximum absorption wavelength is more preferably 460.0 to 463.0 nm, further preferably 461.0 to 462.0 nm In order for the phosphorus compound to functionally form a complex having catalytic activity together with the aluminum compound to exhibit polymerization activity, it is important to set the acidity of the phosphorus compound contained in the ethylene glycol solution to be in a specific range.

The above maximum absorption wavelength is affected by the type and the addition amount of the phosphorus compound to be used, or the temperature, the pressure, the time, or the like when preparing the ethylene glycol solution. If the maximum absorption wavelength exceeds the above range, the acidity of the phosphorus compound is low, and a complex with the aluminum compound is not sufficiently formed, so that the aluminum-based foreign matter is increased due to the phosphorus compound being distilled out of the polymerization system. Therefore, such a maximum absorption wavelength is not preferable. On the other hand, if the maximum absorption wavelength is less than the above range, the acidity of the phosphorus compound is high, and the binding with the aluminum compound becomes strong, so that the polymerization activity may significantly decrease.

The method for measuring the maximum absorption wavelength (color reaction P) of the ethylene glycol solution of the phosphorus compound was carried out according to an evaluation method (5) in EXAMPLES described later.

Moreover, as the ethylene glycol solution of the phosphorus compound used in the present invention, a solution obtained by performing heat treatment in ethylene glycol in advance is preferably used. The heat treatment in ethylene glycol is preferably performed after the phosphorus compound is dissolved, but the phosphorus compound does not have to be completely dissolved.

As for the conditions for the above heat treatment, the heat treatment temperature is preferably 175 to 96° C., more preferably 175 to 185° C., and further preferably 175 to 180° C. The heat treatment time is preferably 30 to 240 minutes, more preferably 60 to 210 minutes, further preferably 125 to 210 minutes, and particularly preferably 140 to 210 minutes.

The concentration of the phosphorus compound during the above heat treatment is preferably 3 to 10% by mass.

By the above heat treatment, the acidity of the phosphorus compound contained in the ethylene glycol solution can be made constant, the polymerization activity due to the use in combination with the aluminum compound is improved, and the amount of aluminum-based foreign matter generated due to the polymerization catalyst can be decreased.

In the above heat treatment, the structure of a part of the 3,5-di-tert-butyl-4-hydroxybenzylphosphonic acid dialkyl ester, which is used in the present invention and is the phosphorus compound represented by chemical formula (1), changes. For example, the structure of the part of the 3,5-di-tert-butyl-4-hydroxybenzylphosphonic acid dialkyl ester changes to structures caused by desorption of t-butyl group, hydrolysis of ethyl ester group, and hydroxyethyl ester (transesterification with ethylene glycol) (desorption of t-butyl group occurs prominently at high temperatures in the polymerization process). Therefore, in the present invention, in the case where the phosphorus compound is a 3,5-di-tert-butyl-4-hydroxybenzylphosphonic acid diethyl ester, phosphorus compounds obtained through structure change such as compounds in chemical formulas (I-b) to (1-j) are also included in addition to the phosphorus compound represented by chemical formula (1-a).

The amount of each component of the phosphorus compound species in the above ethylene glycol solution of the phosphorus compound can be quantified by a β-NMR spectrum measurement method of the solution.

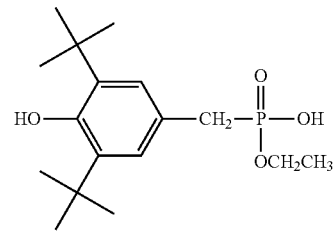

chemical formula (1-b)

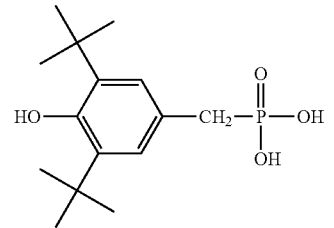

chemical formula (1-c)

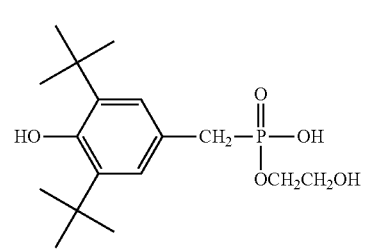

chemical formula (1-d)

chemical formula (1-e)

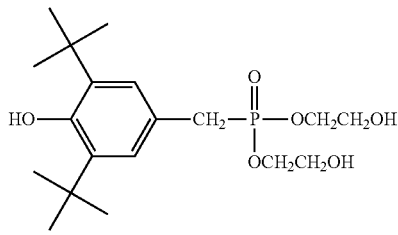

chemical formula (1-f)

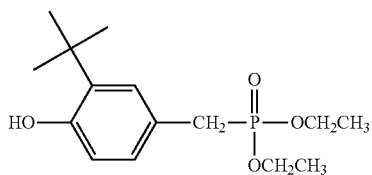

chemical formula (1-g)

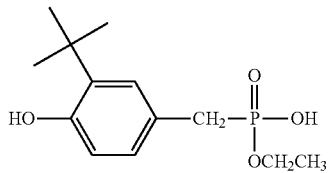

chemical formula (1-h)

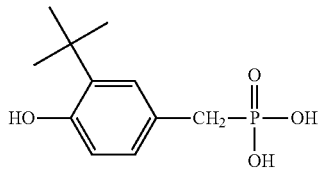

chemical formula (1-i)

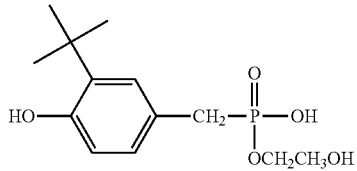

chemical formula (1-j)

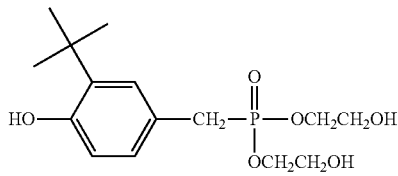

Therefore, as the phosphorus compound in the present invention, modified products of the diethyl 3,5-di-tert-butyl-4-hydroxybenzylphosphonates represented by the above chemical formulas (1-b) to (1-j) are also included in addition to the diethyl 3,5-di-tert-butyl-4-hydroxybenzylphosphonates.

A color reaction AP in the present invention will be described.

A mixed solution obtained by mixing the ethylene glycol solution of the aluminum compound and the ethylene glycol solution of the phosphorus compound, which are used in the present invention, at the ratio of amounts to be added in the production process for the polyester resin preferably has a maximum absorption wavelength of 559.5 to 561.5 nm measured after mixing with a 1 mmol/L aqueous solution of Mordant Blue 13, which is an acid dye. The maximum absorption wavelength is more preferably 559.5 to 561.0 nm, further preferably 559.5 to 560.8 nm, and particularly preferably 559.7 to 560.6 nm.

When the maximum absorption wavelength of the mixed solution is set to be in the above range, the complex formation reaction of the aluminum compound and the phosphorus compound can be kept in a preferable state to achieve both polymerization activity and suppression of aluminum-based foreign matter, so that such a maximum absorption wavelength is preferable.

If the maximum absorption wavelength exceeds the above range, the basicity of the mixed solution of the ethylene glycol solution of the aluminum compound and the ethylene glycol solution of the phosphorus compound is high, and the polymerization system of the polyester resin is acidic. Therefore, when the mixed solution of the ethylene glycol solution of the aluminum compound and the ethylene glycol solution of the phosphorus compound is added to the polymerization system, the aluminum compound may be neutralized with the carboxyl group terminal of the polyester resin to generate foreign matter, increasing the amount of aluminum-based foreign matter. On the other hand, if the maximum absorption wavelength is less than the above range, the basicity of the mixed solution of the ethylene glycol solution of the aluminum compound and the ethylene glycol solution of the phosphorus compound is excessively decreased, and the coordination between the aluminum compound and the phosphorus compound becomes strong, so that the polymerization activity tends to decrease.

The method for measuring the maximum absorption wavelength (color reaction AP) of the mixed solution of the ethylene glycol solution of the aluminum compound and the ethylene glycol solution of the phosphorus compound was carried out according to an evaluation method (7) in EXAMPLES described later.

In the present invention, it is preferable that the ethylene glycol solution of the aluminum compound and the ethylene glycol solution of the phosphorus compound are added at the same time, and in a more preferable embodiment, the ethylene glycol solution of the aluminum compound and the ethylene glycol solution of the phosphorus compound are mixed at an addition ratio in advance to prepare a mixed solution, and the mixed solution as one liquid is added. By adding the solutions in such a manner, the effect of the present invention can be more stably achieved. Examples of the method for making the solutions into one liquid in advance include a method in which the respective solutions are mixed in a tank, and a method in which the respective solutions are joined and mixed in the middle of a pipe for adding the catalyst.

In the case of addition to a reaction vessel, it is preferable to increase stirring of the reaction vessel. In the case of addition to a pipe between reaction vessels, it is preferable to install an in-line mixer or the like to quickly and uniformly mix the added catalyst solutions.

When the ethylene glycol solution of the aluminum compound and the ethylene glycol solution of the phosphorus compound are added separately, a large amount of foreign matter due to the aluminum compound is likely to occur, so that the temperature-rise crystallization temperature decreases, the temperature-decrease crystallization temperature increases, or sufficient catalytic activity is not achieved, in some cases. By adding the aluminum compound and the phosphorus compound at the same time, a complex of the aluminum compound and the phosphorus compound which provides polymerization activity can be quickly and efficiently formed. However, when the aluminum compound and the phosphorus compound are added separately, the formation of the complex of the aluminum compound and the phosphorus compound is insufficient, and the aluminum compound that has not formed a complex with the phosphorus compound may be deposited as foreign matter.

In the present invention, the acid terminal group concentration of an oligomer when the ethylene glycol solution of the aluminum compound and the ethylene glycol solution of the phosphorus compound are added is preferably 400 to 1500 eq/ton and more preferably 500 to 1200 eq/ton. When the set value of the acid terminal group concentration of the above oligomer is set to be in the above range, the activity of the polymerization catalyst can be sufficiently brought out.

Moreover, in the present invention, the ratio (OH %) of the hydroxyl group terminal to the total terminal group concentration of the oligomer is preferably 45 to 70 mol % and more preferably 55 to 65 mol %. If the ratio of the hydroxyl group terminal of the oligomer is less than 45 mol %, the polycondensation activity may become unstable and the amount of aluminum-based foreign matter may increase. On the other hand, if the ratio of the hydroxyl group terminal of the oligomer exceeds 70 mol %, the polycondensation activity may decrease.

EXAMPLES

Hereinafter, the present invention will be specifically described by means of examples, but the present invention is not limited to these examples. The evaluation methods for main characteristic values were based on the following methods.

[Evaluation Methods]

(1) Intrinsic Viscosity (IV) of Polyester Resin

The polyester resin was dissolved in a mixed solvent of phenol and 1,1,2,2-tetrachloroethane (=3/2; mass ratio) and measured at a temperature of 30° C.

(2) Content (Residual Amount) of Aluminum Atom in Polyester Resin

The polyester resin was weighed in a platinum crucible, carbonized on an electric stove, and then incinerated in a muffle furnace under the conditions of 550° C. and 8 hours. The incinerated sample was dissolved in 1.2 M hydrochloric acid to prepare a sample solution. The aluminum element concentration of the prepared sample solution was determined by high-frequency inductively coupled plasma emission spectrometry.

Apparatus: CIROS-120 manufactured by SPECTRO
Plasma output: 1400 W
Plasma gas: 13.0 L/min
Auxiliary gas: 2.0 L/min
Nebulizer: cross flow nebulizer
Chamber: cyclone chamber
Measurement wavelength: 167.078 nm (3) Content (Residual Amount) of Phosphorus Atom in Polyester Resin The polyester resin was subjected to wet decomposition with sulfuric acid, nitric acid, and perchloric acid, and then neutralized with aqueous ammonia. Ammonium molybdate and hydrazine sulfate were added to the prepared solution, and the absorbance at a wavelength of 830 nm was measured using an ultraviolet-visible absorptiometer (UV-1700, manufactured by SHIMADZU CORPORATION). The concentration of phosphorus element in the sample was determined from a calibration curve prepared in advance.

(4) Aluminum-Based Foreign Matter Amount 30 g of the polyester resin and 250 ml of a p-chlorophenol/tetrachloroethane (3/1: mass ratio) mixed solution were put in a 500 mL Erlenmeyer flask containing a stirrer, and heated and dissolved at 100 to 105° C. for 1.5 hours using a hot stirrer. The solution was filtered to separate foreign matter using a membrane filter made of polytetrafluoroethylene and having a diameter of 47 mm and a pore size of 1.0 μm (PTFE membrane filter manufactured by Advantec, product name: T100A047A). The effective filtration diameter was 37.5 mm. After the completion of filtration, washing was subsequently performed using 50 mL of chloroform, and then the filter was dried.

The amount of aluminum element was quantified on the filtration surface of the membrane filter with a scanning fluorescent X-ray analyzer (ZSX100e, Rh line bulb: 4.0 kW, manufactured by RIGAKU). The quantification was performed on a central portion of the membrane filter having a diameter of 30 mm. A calibration curve of the fluorescent X-ray analysis method was obtained using a polyethylene terephthalate resin having a known aluminum element content, and the apparent amount of aluminum element was indicated in ppm. The measurement was carried out by measuring the Al-Kα ray intensity under the conditions of PHA (pulse height analyzer) 100-300 using pentaerythritol as a spectroscopic crystal and a PC (proportional counter) as a detector at an X-ray output of 50 kV-70 mA. The amount of aluminum element in the PET resin for the calibration curve was quantified by high-frequency inductively coupled plasma emission spectrometry.

(5) Maximum Absorption Wavelength (Color Reaction P) of Ethylene Glycol Solution of Phosphorus Compound 4 mL of ethylene glycol and 0.3 mL of a 1 mmol/L aqueous solution of Bismarck Brown were added to a 6 mL sample bottle, then 0.1 mL of an ethylene glycol solution of a phosphorus compound was added thereto, the sample bottle was covered with a lid, and the solution was shaken for 10 seconds until the solution became uniform. The solution was allowed to stand at room temperature (23° C.) for 10 minutes, and then the absorption spectrum of the sample solution was measured using an ultraviolet visible spectrophotometer to determine the maximum absorption wavelength. In this measurement, the room temperature was set to 15 to 30° C., and the series of operations was performed indoors in this temperature range.

Apparatus: ultraviolet visible spectrophotometer UV-1800 manufactured by SHIMADZU CORPORATION
Spectral bandwidth: 1 nm
Sample cell: square cell (material: polymethyl methacrylate (PMMA), optical path length: 10 mm)
Control liquid: ethylene glycol
Scan range: 400 to 700 nm
Scan speed setting: 0.05 sec
Scan pitch: 0.2 nm
Number of scans: 1 time (6) Maximum Absorption Wavelength (Color Reaction A) of Ethylene Glycol Solution of Aluminum Compound 4 mL of ethylene glycol and 0.3 mL of a 1 mmol/L aqueous solution of Mordant Blue 13 were added to a 6 mL sample bottle, then 0.1 mL of an ethylene glycol solution of an aluminum compound was added thereto, the sample bottle was covered with a lid, and the solution was shaken for 10 seconds until the solution became uniform. The solution was allowed to stand at room temperature (23° C.) for 10 minutes, and then the absorption spectrum of the sample solution was measured using an ultraviolet visible spectrophotometer to determine the maximum absorption wavelength. In this measurement, the room temperature was set to 15 to 30° C., and the series of operations was performed indoors in this temperature range.

Apparatus: ultraviolet visible spectrophotometer UV-1800 manufactured by SHIMADZU CORPORATION Spectral bandwidth: 1 nm Sample cell: square cell (material: PMMA, optical path length: 10 mm)

Control liquid: ethylene glycol

Scan range: 400 to 700 nm

Scan speed setting: 0.05 sec

Scan pitch: 0.2 nm

Number of scans: 1 time (7) Maximum Absorption Wavelength (Color Reaction AP) of Mixed Solution of Ethylene Glycol Solution of Aluminum Compound and Ethylene Glycol Solution of Phosphorus Compound 4 mL of ethylene glycol and 0.3 mL of a 1 mmol/L aqueous solution of Mordant Blue 13 were added to a 6 mL sample bottle, then 0.1 mL of a mixed solution of the ethylene glycol solution of the aluminum compound and the ethylene glycol solution of the phosphorus compound was added thereto, the sample bottle was covered with a lid, and the solution was shaken for 10 seconds until the solution became uniform. The solution was allowed to stand at room temperature (23° C.) for 10 minutes, and then the absorption spectrum of the sample solution was measured using an ultraviolet visible spectrophotometer to determine the maximum absorption wavelength. In this measurement, the room temperature was set to 15 to 30° C., and the series of operations was performed indoors in this temperature range.

Apparatus: ultraviolet visible spectrophotometer UV-1800 manufactured by SHIMADZU CORPORATION Spectral bandwidth: 1 nm Sample cell: square cell (material: PMMA, optical path length: 10 mm)

Control liquid: ethylene glycol

Scan range: 400 to 700 nm

Scan speed setting: 0.05 sec

Scan pitch: 0.2 nm

Number of scans: 1 time (8) Back Pressure Increase Coefficient (k)

The polyester resin was vacuum dried at 140° C. for 16 hours, and then supplied to a melt extruder, the pressure at the outlet of the extruder was controlled to 1.96 MPa, and a spinning test was performed at a spinning temperature of 295° C. and a discharge rate of 6 g/min for 4 hours using filters having a filter diameter of 14 mmΦ. During the spinning test, the filter pressure was recorded every 30 minutes, and a back pressure increase amount ΔP per unit time (MPa/hour) was calculated using the value of pressure (MPa) after 4 hours from the start of spinning and the value of pressure (MPa) at the start of spinning.

As a spinning nozzle, a nozzle having 12 orifices with a pore size of 0.23 mmΦ and a length of 0.3 mm was used. As the filters, filters having structures of a 100-mesh wire mesh, a 10 μm Naslon filter, a 100-mesh wire mesh, and a 50-mesh wire mesh were used in order from the extruder outlet side.

A back pressure increase coefficient k was calculated by the following equation from the back pressure increase amount ΔP per unit time (MPa/hour), a flow rate Q (kg/hour), and a filtration area S (cm$^2$).

$$k = \Delta P/(Q/S)$$

The area S was calculated from the filter diameter, and the flow rate Q was calculated from the discharge rate.

[Preparation of Polycondensation Catalyst Solution]

(1) Preparation of Ethylene Glycol Solution of Aluminum Compound

Equal amounts (volume ratio) of ethylene glycol and a 20 g/L aqueous solution of basic aluminum acetate were put in a compounding tank, and the mixture was stirred at room temperature (23° C.) for several hours. Then, water was distilled of from the system with stirring at 50 to 90° C. under reduced pressure (3 kPa) for several hours to prepare a 20 g/L ethylene glycol solution of the aluminum compound.

The maximum absorption wavelength of the obtained solution was 571.6 nm.

(2) Preparation of Ethylene Glycol Solution of Phosphorus Compound

Formulation Example 1: Used in Examples 1 to 8 and Comparative Examples 1 to 5, 7, and 8

As a phosphorus compound. Irganox 1222 (manufactured by BASF) was put in a compounding tank together with ethylene glycol, and heat-treated at 175° C. for 150 minutes with stirring under nitrogen purge to prepare a 50 g/L ethylene glycol solution of the phosphorus compound.

The maximum absorption wavelength of the obtained solution was 461.2 nm.

Formulation Example 2: Used in Comparative Example 6

An ethylene glycol solution of the phosphorus compound was prepared in the same manner as Formulation Example 1 described above, except that in Formulation Example 1, the heat treatment conditions were changed to 60 minutes at 80° C.

The maximum absorption wavelength of the obtained solution was 470.8 nm.

[Example of Batch Type Polymerization Method]

Example 1

A prepared polyester oligomer composed of high-purity terephthalic acid and ethylene glycol and having an esterification rate of about 95% and high-purity terephthalic acid were put in a 10 L stainless steel autoclave equipped with a stirrer, and an esterification reaction was carried out at 260° C. to obtain an oligomer mixture. The obtained oligomer mixture had an acid terminal group concentration of 750 eq/ton and a hydroxyl terminal group ratio (OH %) of 59 mol %.

The ethylene glycol solution of the aluminum compound and the ethylene glycol solution of the phosphorus compound, which were prepared by the above methods, were added to the obtained oligomer mixture in 10 ppm and 20 ppm as the aluminum atom and the phosphorus atom with respect to the mass of the obtained polyester resin, respectively.

Thereafter, the temperature of the system was raised to 280° C. in 1 hour, the pressure of the system was gradually reduced to 0.15 kPa during this period, and a polycondensation reaction was carried out under these conditions (polycondensation time: 46 minutes) to obtain a polyester resin having an IV of 0.60 dl/g.

Examples 2 to 5, Comparative Examples 1 to 5

Polyester resins were obtained in the same manner as Example 1, except that in the polymerization method of Example 1, the ethylene glycol solution of the aluminum compound and the ethylene glycol solution of the phosphorus compound were added in the element amounts shown in Table 1 with respect to the mass of the obtained polyester resin, respectively.

Comparative Example 6

A polyester resin was obtained in the same manner as Example 2, except that the solution shown in Formulation Example 2 described above was used as an ethylene glycol solution of an phosphorus compound.

Table 1 shows the physical properties of the polyester resins obtained in Examples 1 to 5 and Comparative Examples 1 to 6. In Table 1 and Table 2 described later, the addition amount and the residual amount of aluminum element are shown as Al, the addition amount and the residual amount of phosphorus element are shown as P. and the addition mole ratio and the residual mole ratio of phosphorus element to aluminum element are shown as P/Al.

TABLE 1

| Item | | Example 1 | Example 2 | Example 3 | Example 4 | Example 5 | Comparative Example 1 |
|---|---|---|---|---|---|---|---|
| Addition amounts of catalyst element | Al (mass ppm) | 10 | 14 | 13 | 12 | 17 | 21 |
| | P (mass ppm) | 20 | 30 | 32 | 24 | 36 | 58 |
| | P/Al (mole ratio) | 1.74 | 1.87 | 2.14 | 1.74 | 1.84 | 2.41 |
| Maximum absorption wavelength (nm) | Ethylene glycol solution of aluminum compound | 571.6 | 571.6 | 571.6 | 571.6 | 571.6 | 571.6 |
| | Ethylene glycol solution of phosphorus compound | 461.2 | 461.2 | 461.2 | 461.2 | 461.2 | 461.2 |
| | Mixed solution | 560.4 | 560.2 | 560.0 | 560.2 | 560.4 | 559.6 |
| Polycondensation time (min) | | 46 | 46 | 52 | 45 | 45 | 68 |
| IV (dl/g) | | 0.60 | 0.60 | 0.00 | 0.61 | 0.60 | 0.59 |
| Residual amounts of catalyst element | Al (mass ppm) | 10 | 14 | 13 | 12 | 17 | 21 |
| | P (mass ppm) | 16 | 23 | 24 | 19 | 28 | 44 |
| | P/Al (mole ratio) | 1.39 | 1.43 | 1.61 | 1.38 | 1.43 | 1.83 |
| Amount of aluminum-based foreign matter (mass ppm) | | 2300 | 2200 | 1500 | 2000 | 2500 | 710 |
| Back pressure increase coefficient k | | 0.21 | 0.20 | 0.17 | 0.19 | 0.22 | 0.14 |

| Item | | Comparative Example 2 | Comparative Example 3 | Comparative Example 4 | Comparative Example 5 | Comparative Example 6 |
|---|---|---|---|---|---|---|
| Addition amounts of catalyst element | Al (mass ppm) | 18 | 8 | 21 | 14 | 14 |
| | P (mass ppm) | 58 | 20 | 20 | 20 | 30 |
| | P/Al (mole ratio) | 2.81 | 2.18 | 0.83 | 1.24 | 1.87 |
| Maximum absorption wavelength (nm) | Ethylene glycol solution of aluminum compound | 571.6 | 571.6 | 571.6 | 571.6 | 571.6 |
| | Ethylene glycol solution of phosphorus compound | 461.2 | 461.2 | 461.2 | 461.2 | 470.8 |
| | Mixed solution | 559.2 | 560.0 | 562.4 | 561.6 | 561.0 |
| Polycondensation time (min) | | 68 | 68 | 40 | 43 | 42 |
| IV (dl/g) | | 0.59 | 0.61 | 0.61 | 0.60 | 0.60 |
| Residual amounts of catalyst element | Al (mass ppm) | 18 | 8 | 20 | 13 | 13 |
| | P (mass ppm) | 39 | 14 | 18 | 17 | 18 |
| | P/Al (mole ratio) | 1.89 | 1.52 | 0.78 | 1.14 | 1.21 |
| Amount of aluminum-based foreign matter (mass ppm) | | 710 | 1200 | 14000 | 6100 | 5000 |
| Back pressure increase coefficient k | | 0.14 | 0.16 | 3.20 | 0.50 | 0.45 |

The polyester resins of Examples 1 to 5 have a short polycondensation time even though the residual amounts of aluminum and phosphorus are small, and these polyester resins also have a small amount of aluminum-based foreign matter, so that the back pressure increase coefficient is low and the quality is high. Moreover, since the addition amount of the catalyst is also small, the cost of the catalyst can be reduced.

In Comparative Examples 1 and 2, the catalyst cost is high due to the large addition amount of the phosphorus compound, and the addition mole ratio of phosphorus atom to aluminum atom is high and thus aluminum-based foreign matter is suppressed, so that Comparative Examples 1 and 2 are preferable in these points, but the polymerization activity is low.

In Comparative Example 3, the mole ratio of phosphorus atom to aluminum atom is in the range of the present invention, but the residual amount of aluminum is excessively low, so that the polymerization activity is insufficient and the polycondensation time is longer.

In Comparative Examples 4 and 5, since the mole ratio of phosphorus atom to aluminum atom is excessively low, the amount of aluminum-based foreign matter in the polyester resin increases and the back pressure increase coefficient becomes higher, so that the quality of the polyester resin is inferior.

In Comparative Example 6, the addition mole ratio of phosphorus atom to aluminum atom is in the range of the present invention, the polycondensation time is short, and the catalyst cost is also low. However, the maximum absorption wavelength of the color reaction P is excessively large as compared with those of Examples 1 to 5, so that the residual mole ratio of phosphorus atom to aluminum atom is lower. In addition, the amount of aluminum-based foreign matter in the polyester resin increases and the back pressure increase coefficient becomes higher, so that the quality of the polyester resin is inferior.

[Example of Continuous Polymerization Method]

Example 6

A slurry prepared by mixing 0.75 parts by mass of ethylene glycol with 1 part by mass of high-purity terephthalic acid was continuously supplied to a continuous polyester production apparatus including three continuous esterification reactors and three polycondensation reactors and having an in-line mixer equipped with a high-speed stirrer and installed on a transfer line from the third esterification reactor to the first polycondensation reactor, and a reaction was caused at a reaction temperature of 255° C. and a pressure of 203 kPa at the first esterification reactor, a reaction temperature of 261° C. and a pressure of 102 kPa at the second esterification reactor, and a reaction temperature of 261 to 263° C. and a pressure of 126 kPa at the third esterification reactor, to obtain an oligomer. The oligomer at the outlet of the third esterification reactor had an acid terminal group concentration of 550 eq/ton and a hydroxyl group terminal ratio (OH %) of 60 mol %.

The ethylene glycol solution of the aluminum compound and the ethylene glycol solution of the phosphorus compound, which were prepared by the above methods, were mixed to obtain a mixed solution as one liquid such that 13 ppm and 36 ppm were achieved as aluminum atom and phosphorus atom with respect to the mass of the obtained polyester resin, respectively, and the mixed solution was added to the obtained oligomer using the in-line mixer on the transfer line from the third esterification tank to the first polycondensation reactor.

The low-order condensation product was continuously transferred to a continuous polycondensation apparatus including three reactors, and polycondensation was carried out at a reaction temperature of 268° C. and a pressure of 5.3 kPa at the first polycondensation reactor, a reaction temperature of 270° C. and a pressure of 0.930 kPa at the second polycondensation reactor, and a reaction temperature of 274° C. and a pressure of 0.162 kPa at the third polycondensation reactor to obtain a polyester resin having an IV of 0.59 dl/g. The polyester resin was extruded into strands, cooled in water, and then cut to be pelletized.

Examples 7 and 8, Comparative Examples 7 and 8

Polyester resins were obtained in the same manner as Example 6, except that in the polymerization method of Example 6, the ethylene glycol solution of the aluminum compound and the ethylene glycol solution of the phosphorus compound were added in the catalyst element amounts shown in Table 2 with respect to the mass of the obtained polyester resin.

Table 2 shows the physical properties and the like, of the polyester resins obtained in Examples 6 to 8 and Comparative Examples 7 and 8.

TABLE 2

| Item | | Example 6 | Example 7 | Example 8 | Comparative Example 7 | Comparative Example 8 |
|---|---|---|---|---|---|---|
| Addition amounts of catalyst element | Al (mass ppm) | 13 | 12 | 1.7 | 21 | 21 |
| | P (mass ppm) | 36 | 24 | 36 | 58 | 20 |
| | P/Al (mole ratio) | 2.41 | 1.74 | 1.84 | 2.41 | 0.83 |
| Maximum absorption wavelength (nm) | Ethylene glycol solution of aluminum compound | 571.6 | 571.6 | 571.6 | 571.6 | 571.6 |
| | Ethylene glycol solution of phosphorus compound | 461.2 | 461.2 | 461.2 | 461.2 | 461.2 |
| | Mixed solution | 559.6 | 560.2 | 560.4 | 559.6 | 562.4 |
| Production amount ratio | | 1.02 | 1.05 | 1.06 | 1.00 | 0.95 |
| IV (dl/g) | | 0.59 | 0.59 | 0.59 | 0.59 | 0.59 |
| Residual amounts of catalyst element | Al (mass ppm) | 13 | 12 | 17 | 21 | 20 |
| | P (mass ppm) | 25 | 19 | 28 | 45 | 18 |
| | P/Al (mole ratio) | 1.68 | 1.38 | 1.43 | 1.87 | 0.78 |
| Amount of aluminum-based foreign matter (mass ppm) | | 550 | 1800 | 2500 | 450 | 10000 |
| Back pressure increase coefficient k | | 0.14 | 0.18 | 0.22 | 0.13 | 1.50 |

As for the production amount ratio shown in Table 2, the hourly production amounts of Examples 6 to 8 and Comparative Example 8 are represented in ratio based on the hourly production amount of Comparative Example 7 (with the hourly production amount of Comparative Example 7 being regarded as 1.00). When the production amount ratio is higher than 1, it indicates that the polymerization activity of the catalyst is high, and when the production amount ratio is equal to or lower than 1, it indicates that the polymerization activity of the catalyst is low.

The polyester resins of Examples 6 to 8 have a higher production amount ratio than Comparative Examples 7 and 8, and the polymerization activity is improved even though the residual amounts of aluminum and phosphorus are small. In addition, since the amount of aluminum-based foreign matter in the polyester resin is small, the back pressure increase coefficient is also low, so that a high-quality polyester resin is obtained.

In Comparative Example 8, since the residual mole ratio of phosphorus atom to aluminum atom is excessively low, the amount of aluminum-based foreign matter in the polyester resin increases and the back pressure increase coefficient becomes higher, so that the quality of the polyester resin is inferior.

Using the results of Examples 1 to 5 and Comparative Examples 1, 2, and 4 to 6 in Table 1, the relationship between the residual mole ratio of phosphorus atom to aluminum atom, the amount of aluminum-based foreign matter, and the polycondensation time is shown in FIG. 1.

In addition, the relationship between the maximum absorption wavelength of the catalyst mixed solution of the ethylene glycol solution of the aluminum compound and the ethylene glycol solution of the phosphorus compound, the amount of aluminum-based foreign matter, and the polycondensation time is shown in FIG. 2. Furthermore, the relationship between the maximum absorption wavelength of the catalyst mixed solution of the ethylene glycol solution of the aluminum compound and the ethylene glycol solution of the phosphorus compound and the back pressure increase coefficient k is shown in FIG. 3.

In these figures, the values of Comparative Example 3 are excluded. The reason is that in Comparative Example 3, the mole ratio of phosphorus atom to aluminum atom is in the range of the present invention, but the residual amount of aluminum is excessively small, so that the catalytic activity is not sufficiently exhibited and the polymerization activity is insufficient as compared with the other cases.

From these figures, it is clear that the range of the present invention is critical. It is also clear that the amount of aluminum-based foreign matter and the polycondensation time have a trade-off relationship.

INDUSTRIAL APPLICABILITY

The polyester resin of the present invention can improve the productivity of the polyester resin while reducing the catalyst cost to be low, and can reduce catalyst-derived foreign matter contained in the polyester resin. Accordingly, it is possible to provide a clean, high-quality polyester resin, so that the polyester resin of the present invention greatly contributes to the industry.

The invention claimed is:

1. A polyester resin containing an aluminum compound and a phosphorus compound used as a catalyst, wherein the following formulas (1) to (3) are satisfied, $$9 \leq Al \leq 20 \tag{1}$$

$$13 \leq P \leq 31, \text{ and} \tag{2}$$

$$1.32 \leq P/Al \leq 1.39, \tag{3}$$

wherein, in the formulas (1) to (3), Al denotes an amount based on mass (ppm) of aluminum atom contained in the polyester resin, P denotes an amount based on mass (ppm) of phosphorus atom contained in the polyester resin, and P/Al denotes a mole ratio of phosphorus atom to aluminum atom in the polyester resin.

2. The polyester resin according to claim 1, wherein a content of aluminum-based foreign matter with respect to a mass of the polyester resin is not larger than 3000 ppm.

3. The polyester resin according to claim 1, wherein the polyester resin has an intrinsic viscosity (IV) of not less than 0.56 dl/g.

4. The polyester resin according to claim 1, wherein the phosphorus compound is a 3,5-di-tert-butyl-4-hydroxybenzylphosphonic acid dialkyl ester.

* * * * *